US012731039B2

(12) United States Patent
Liu et al.

(10) Patent No.: US 12,731,039 B2
(45) Date of Patent: Sep. 8, 2026

(54) DECISION TREE-ORIENTED VERTICAL FEDERATED LEARNING METHOD

(71) Applicant: ZHEJIANG UNIVERSITY, Hangzhou (CN)

(72) Inventors: Jian Liu, Hangzhou (CN); Rui Zhang, Hangzhou (CN); Zhihua Tian, Hangzhou (CN); Xiaoyang Hou, Hangzhou (CN); Kui Ren, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 1023 days.

(21) Appl. No.: 17/686,346

(22) Filed: Mar. 3, 2022

(65) Prior Publication Data

US 2022/0188649 A1 Jun. 16, 2022

Related U.S. Application Data

(63) Continuation of application No. PCT/CN2020/126853, filed on Nov. 5, 2020.

(51) Int. Cl.
*G06N 5/01* (2023.01)
*G06F 7/24* (2006.01)
(Continued)

(52) U.S. Cl.
CPC ................ *G06N 5/01* (2023.01); *G06F 7/24* (2013.01); *G06F 18/2148* (2023.01); *G06F 18/2163* (2023.01)

(58) Field of Classification Search
CPC .. G06N 5/01; G06N 20/00; G06F 7/24; G06F 18/2148; G06F 18/2163
See application file for complete search history.

(56) References Cited

U.S. PATENT DOCUMENTS

2006/0034508 A1 2/2006 Zhou et al.
2020/0358599 A1* 11/2020 Baracaldo Angel ........................ G06F 21/6227

FOREIGN PATENT DOCUMENTS

CN 110490738 A 11/2019
CN 110851785 A 2/2020
(Continued)

OTHER PUBLICATIONS

Yang, Bishan, et al. "BOAI: Fast alternating decision tree induction based on bottom-up evaluation." Advances in Knowledge Discovery and Data Mining: 12th Pacific-Asia Conference, PAKDD 2008 Osaka, Japan, May 20-23, 2008 Proceedings 12. Springer Berlin Heidelberg, 2008. (Year: 2008).*
(Continued)

*Primary Examiner* — Cesar B Paula
(74) *Attorney, Agent, or Firm* — Wiersch Law Group

(57) ABSTRACT

Provided is a decision tree-oriented vertical federated learning method, which mainly comprises the following steps: 1) all participants sorting local samples for each local feature, and then dividing the sorted samples into different blocks in sequence, each block being called a bucket; 2) for a group of samples corresponding to each feature, a bucket number of each sample under this feature having a certain probability to become other bucket numbers, and selecting an appropriate probability to make this encryption method meet the definition of differential privacy; 3) each participant sending serial numbers of buckets assigned to different samples under different features to the participant who holds a label, and this participant being called a coordinator; 4) the coordinator training a decision tree model according to these samples, and no other participants being needed in the training process.

4 Claims, 3 Drawing Sheets

(51) Int. Cl.
*G06F 18/21* (2023.01)
*G06F 18/214* (2023.01)

(56) References Cited

FOREIGN PATENT DOCUMENTS

| | | | | | |
|---|---|---|---|---|---|
| CN | 110851786 A | | 2/2020 | | |
| CN | 111598186 A | * | 8/2020 | ........... | G06K 9/6257 |
| CN | 111695697 A | * | 9/2020 | ........... | G06K 9/6282 |

OTHER PUBLICATIONS

Wang, Shaowei, et al. "Private weighted histogram aggregation in crowdsourcing." Wireless Algorithms, Systems, and Applications: 11th International Conference, WASA 2016, Bozeman, MT, USA, Aug. 8-10, 2016. Proceedings 11. Springer International Publishing, 2016. (Year: 2016).*

Cheng, Kewei, et al. "SecureBoost: A Lossless Federated Learning Framework." arXiv preprint arXiv:1901.08755 (2019). (Year: 2019).*

Agarwal, Alekh, John Langford, and Chen-Yu Wei. "Federated residual learning." arXiv preprint arXiv:2003.12880 (2020). (Year: 2020).*

Fang, Wenjing, et al. "A hybrid-domain framework for secure gradient tree boosting." arXiv preprint arXiv:2005.08479 (2020). (Year: 2020).*

Wu, Yuncheng, et al. "Privacy preserving vertical federated learning for tree-based models." arXiv preprint arXiv:2008.06170 (2020). (Year: 2020).*

Tian et al, FederBoost: Private Federated Learning for GBDT, IEEE Transactions on Dependable and Secure Computing, vol. 21, No. 3, May/Jun. 2024.*

International Search Report (PCT/CN2020/126853); Date of Mailing: Jul. 28, 2021.

Xgboost: A scal-able tree boosting system , Chen et al, ACM 2016.

Communication-efficient learning of deep networks from decentralized data ,McMahan et al, AIStats 2017.

Private Weighted Histogram Aggregation in Crowdsourcing, Wang et al, Springer 2016

* cited by examiner

DECISION TREE-ORIENTED VERTICAL FEDERATED LEARNING METHOD

CROSS-REFERENCE TO RELATED APPLICATIONS

The present application is a continuation of International Application No. PCT/CN2020/126853, filed on Nov. 5, 2020, the content of which are incorporated herein by reference in their entireties.

TECHNICAL FIELD

The present application relates to the field of federated learning, in particular to a decision tree-oriented vertical federated learning method.

BACKGROUND

Federated learning, also known as integrated learning, is a machine learning technology that trains models together on multiple distributed devices or servers that store data. Different from traditional centralized learning, this method does not need to merge data together, so data exist independently.

The concept of federated learning was first proposed by Google in 2017 (Brendan McMahan, Eider Moore, Daniel Ramage, Seth Hampson, and Blaise Aguera y Arcas. Communication-efficient learning of deep networks from decentralized data. In Aarti Singh and Jerry Zhu, editors, Proceedings of the 20th International Conference on Artificial Intelligence and Statistics, volume 54, pages 1273-1282, Fort Lauderdale, FL, USA, 20-22 Apr. 2017. PMLR.), which has been greatly developed and applied in more and more fields. According to the different ways of data division, it is mainly divided into vertical federated learning and horizontal federated learning. In vertical federated learning, researchers distribute the training process of neural networks among multiple participants, and iteratively aggregate local training models into a joint global model. In this process, there are two main roles: a central server and multiple participants. At the beginning of training, the central server initializes the model and sends it to all participants. During each iteration, each participant trains the received model with local data and sends the training gradient to the central server. The central server aggregates the received gradients to update the global model. Thanks to this way of transferring intermediate results instead of original data, federated learning has the following advantages: (1) protecting privacy: during the training process, the data is still stored on local devices; (2) low delay: the updated model can be used for users to predict on equipment; (3) reducing the computational burden: the training process is distributed on multiple devices instead of one device.

SUMMARY

The purpose of the present application is to provide a decision tree-oriented vertical federated learning method, which uses the mode of transferring local data sorting by participants instead of the mode of continuously transferring model parameters in federated learning, thereby greatly reducing a large amount of resources consumed by encryption of federated learning itself and improving the efficiency of federated learning.

The purpose of the present application is realized by the following technical solution:

A decision tree-oriented vertical federated learning method, including the following steps:

(1) each participant sorting local samples according to each feature of the samples contained locally, and then dividing the sorted samples into different blocks in sequence, wherein each block is called a bucket and numbered in sequence, and each bucket contains a same number of samples;

(2) for a group of samples corresponding to each feature, a bucket number of each sample under this feature having a certain probability to be replaced by other bucket numbers, and readjusting the bucket number corresponding to the sample for encryption, wherein, the selected probability makes the encryption method meet the definition of differential privacy;

(3) each participant sending the adjusted bucket numbers of all local samples under different features to a coordinator, who is a participant holding a label;

(4) the coordinator calculating a gradient of each sample according to local label information, and summarizing the gradient of each bucket corresponding to each feature; for a group of samples corresponding to each feature, dividing data by bucket and calculating information gain, and finally, recording a partition position and a current feature corresponding to a maximum information gain, and returning the partition position and the current feature to the participant with the corresponding feature data;

(5) repeating step (4) for each node to train a first tree; and (6) updating parameters, repeating steps (4) and (5), and training the whole model.

Furthermore, the step (1) includes the following substeps:

(1.1) for each participant, sorting the features of the local sample for the participant in ascending or descending order according to the numerical values of the corresponding features, wherein a total number of times for iterations required for sorting is the same as the number of the features;

(1.2) after the sorting is completed, evenly dividing the sorted samples corresponding to each feature, wherein each divided sample is called a bucket, and each feature has the same number of buckets; remaining-recording the order of the divided bucket buckets and recording an order number as a bucket number;

Furthermore, the step (2) includes the following substeps:

(2.1) for each participant, the bucket number of each sample under each feature having a certain probability to become other bucket numbers, wherein the probability has a nonlinear relationship with the number of buckets;

(2.2) according to the number of different buckets and the principle of differential privacy, calculating the probability in (2.1), and readjusting the bucket number corresponding to the sample for encryption.

As a preferred scheme, the original bucket number is deleted first to obtain the possible bucket number sequence $\{0, 1, 2, \ldots j, \ldots, J-1\}$, J is the number of bucket numbers; a random number from 0 to 1 is generated, if the random number is greater than or equal to $$\frac{j}{e^{\varepsilon} + J - 1}$$

and less than $$\frac{j+1}{e^{\varepsilon}+J-1},$$

then the user's bucket number becomes the $j^{th}$ bucket number among the updated possible bucket numbers; if the random number is greater than or equal to $$\frac{J-1}{e^{\varepsilon}+J-1},$$

the bucket number of the sample is unchanged, where:

$$\frac{Pr[bucketize(x_1 \in I)]}{Pr[bucketize(x_2 \in I)]} \le \frac{e^{\varepsilon}}{1} = e^{\varepsilon}$$

$Pr[bucketize(x_1 \in I)]$ indicates the probability that the bucket number of the user $x_1$ is assigned to the bucket I after updating, and $Pr[bucketize(x_2 \in I)]$ indicates the probability that the bucket number of the user $x_2$ is assigned to the bucket I after updating, $\varepsilon$ is used to measure the confidentiality of differential privacy, $\varepsilon \geq 1.5$.

Further, the step (3), the step (3) comprises the following sub-steps:

(3.1) all participants sending the bucket numbers corresponding to the samples obtained in step (2) to the coordinator according to the sequence of the samples;

(3.2) after receiving all the data, the coordinator combining all features of a same sample according to a unique identifier of the sample, establishing a new data table, and storing the data table in a DataFrame data format.

Furthermore, the step (4) comprises the following sub-steps:

(4.1) the coordinator calculating a gradient of each sample according to the established data table, and summarizing the gradients of samples in a same bucket for each feature through the received and local bucket numbers;

(4.2) the coordinator traversing all possible partitions, wherein the coordinator takes each bucket as a unit to participate in the traversal, finds a partition corresponding to a maximum gain, records a current feature and a bucket number at the partition, and returns the current feature and the bucket number to the participant with the corresponding feature data.

Furthermore, the step (5) comprises the following sub-steps:

(5.1) according to the partition corresponding to the maximum gain obtained in step (4), the coordinator dividing the sample data corresponding to each feature into two parts, which are respectively recorded as a left node and a right node, wherein the left and right nodes respectively hold different samples and data corresponding to the samples, and for any node, the data in the node is processed as follows: for each feature, summarizing the gradients of the samples in the same bucket;

(5.2) after performing step (5.1) at the left and right nodes respectively, the coordinator traversing all possible partitions at the left and right nodes respectively, finding the partition corresponding to the maximum gain, recording the current feature and the bucket number at the partition, and returning the current feature and the bucket number to the participant with the corresponding feature data; repeating the traversal until a depth of the decision tree reaches a set maximum.

Furthermore, the step (6) comprises the following sub-steps:

(6.1) the coordinator calculating a residual error according to a result of a previous tree and updating the gradients of all samples;

(6.2) the coordinator repeating steps (4) and (5) to build a new tree according to the updated gradients until the number of decision trees reaches a set maximum number.

The technical solution of the present application is summarized as follows:

1. Before the training starts, the participants sort the local data into buckets and send them to the coordinator.
2. The coordinator receives the data sent by other participants and trains the whole decision tree model in combination with local labels.

According to the above technical solution, the present application has the following beneficial effects:

1. The method of the present application allows the training of the decision tree to avoid the encryption process which consumes a lot of time and a lot of parameter communication processes, so that the training speed is greatly improved.
2. The local data is protected by sorting transfer, and the privacy of different participants in this method is guaranteed by adopting the differential privacy method.

DESCRIPTION OF EMBODIMENTS

Figure 1:
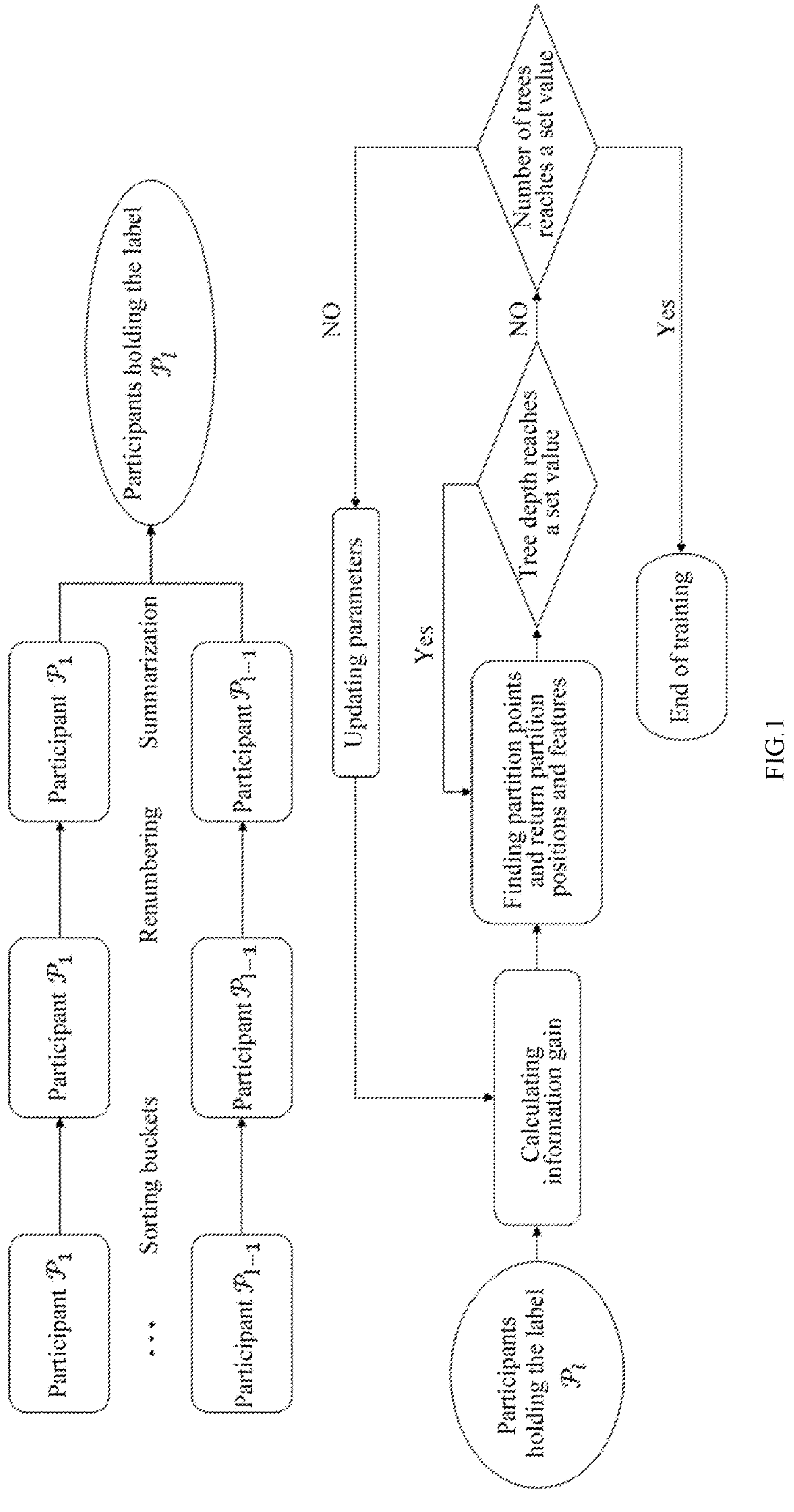
FIG. 1 is a flow chart of a method according to the present disclosure.

The core technology of the present application is to jointly train the whole decision tree model by transferring the order of the data of different participants under the condition of vertically partitioned federated learning, and the model of decision tree is XGBoost model (Tianqi Chen and Carlos Guestrin. Xgboost: A scalable tree boosting system. In Proceedings of the 22nd ACM SIGKDD International Conference on Knowledge Discovery and Data Mining, KDD '16, page 785-794, New York, NY, USA, 2016. Association for ComputingMachinery). In order to describe this method more clearly and completely, this method is described with specific examples below. FIG. 1 is the flow chart of this method, which specifically includes the following steps:

In the example, there are three banks A, B and C, which share the same ten users, and the unique identifiers of the ten users are 1, 2, 3, . . . , 10 respectively. The three banks hold the data corresponding to the features A, B and C of all users respectively. In addition, bank A also holds the labels of all users. Now, it needs to predict labels according to the feature data held by these three banks.

(1) Three banks, A, B and C, sort the unique identifications of users according to features A, B and C respectively. Assuming that five buckets are used as initial parameters for this example, according to the identification sequence obtained by sorting, Bank A divides the sorting of ten user identifications under feature A into five parts, and each part has two user identifications. Next, the bucket number of the user in the $i^{th}$ part under feature A is denoted as i, where i is an integer value from 0 to 4. Similarly, Bank B and Bank C also got the corresponding bucket numbers of ten users under Features B and C.

(2) For users in bank A and their corresponding bucket number data under feature A, each user has the probability to change his own bucket number into any bucket number except the real bucket number, that is, for user 1, the bucket number of the user under feature a is 0, so there is a probability of $$\frac{1}{e^{\varepsilon}+4}$$

for the bucket number 0 of user 1 to be replaced by, $i \neq 0$, $i \in \{0, 1, 2, 3, 4\}$. Specifically, for each user with feature A in A, the user's current bucket number is deleted from the user's possible bucket numbers (0, 1, 2, 3, 4). Assuming the bucket number is 0, the user's possible bucket number now becomes (1, 2, 3, 4), and a random number from 0 to 1 is generated at the same time. If the random number is greater than or equal to $$\frac{j}{e^{\varepsilon}+4}$$

and less than $$\frac{j+1}{e^{\varepsilon}+4},$$

then the user's bucket number becomes the $j^{th}$ bucket number in the updated possible bucket numbers, $j \in \{0, 1, 2, 3\}$; otherwise, if the random number is greater than or equal to $$\frac{4}{e^{\varepsilon}+4},$$

the bucket number of the user does not change. Similarly, the corresponding bucket number data of the user in Bank B under feature B and the corresponding bucket number data of the user in Bank C under feature C have the same change.

The above-mentioned process of changing the bucket number is called bucketize, and this process makes the users $x_1$ and $x_2$ and one bucket I satisfy the definition ε—LDP (Shaowei Wang, Liusheng Huang, Pengzhan Wang, HouDeng, Hongli Xu, and Wei Yang. Private weighted histogram aggregation in crowdsourcing. In Qing Yang, Wei Yu, and Yacine Challal, editors, Wireless Algorithms, Systems, and Applications, pages 250-261, Cham, 2016. Springer International Publishing):

$$\frac{Pr[bucketize(x_1 \in I)]}{Pr[bucketize(x_2 \in I)]} \leq \frac{e^{\varepsilon}}{1} = e^{\varepsilon}$$

where, $Pr[bucketize(x_1 \in I)]$ indicates the probability that the bucket number of the user $x_1$ is assigned to a bucket I after updating, $Pr[bucketize(x_2 \in I)]$ indicates the probability that the bucket number of the user $x_2$ is assigned to a bucket I after updating, ε is used to measure the confidentiality of differential privacy. The smaller ε is, the greater the probability that the user's bucket number changes and the better the confidentiality. On the other hand, the larger ε is, the greater the probability that the bucket number of the user will not change, and the worse the confidentiality. In this method, when ε is greater than or equal to 1.5, the accuracy is basically the same as that of the privacy method without difference on all three data sets.

(3) The users of Bank B and Bank C and their corresponding bucket number data updated in (2) are sent to Bank A, and Bank A integrates the data, that is, summarize the bucket numbers of user x under features A, B and C, where x=1, 2, 3, . . . , 10.

(4) Next, the whole model is trained by the same method as the decision tree model XGBoost:

Bank A calculates the first-order and second-order gradients of each user according to the local labels, and adds the gradients of users in each bucket in feature A, and the results are recorded as the first-order and second-order gradients of the bucket. Similarly, the gradient of each bucket in feature B and feature C is obtained. Next, for feature A, assuming that the partition point is before the first bucket, the information gain of the current partition is calculated; assuming that the partition point is between the first bucket and the second bucket, the information gain is calculated, and so on; all partition situations of feature A are traversed and the information gain of all situations is recorded, then all partition situations of feature B and feature C are traversed, the corresponding information gain is recorded, the maximum information gain and its corresponding feature number and partition point position are found out, and these two data are returned to the bank with this feature.

According to the features, the location of the partition point and the bucket number of users, all users are divided into two parts: the users in the bucket on the left side of the partition point and the users in the bucket on the right side of the partition point, which can be used by the following algorithm.

(5) The process of finding the maximum information gain in (4) is repeated for two parts of users in Bank A and their corresponding bucket numbers under features A, B and C, and these two parts of users are partitioned respectively to finally obtain four parts of users. When the depth of decision tree algorithm is 3, the first tree has finished training.

(6) Bank A recalculates the first-order gradient and the second-order gradient of each user according to the objective function and the results of the previous tree, and repeats the process of partitioning users in (4) and (5) to build a second tree.

(7) Bank A repeats the process of (6), calculates new first-order and two-order gradients by using the results of the previous tree, constructs a new tree, and repeats it continuously until the number of trees reaches the set maximum.

After the training process, the prediction process includes the following steps:

Bank A, Bank B and Bank C have a new user whose ID is 11. They already have the data of user 11 under features A, B and C, and need to get the label of user 11.

(1) Bank B and bank C respectively obtain the partition positions of feature B and feature C sent by bank A in the training process in different positions of the tree structure. According to the obtained partition positions, bank B and bank C find the maximum value and minimum value of corresponding features in the left bucket and the right bucket from the left and right buckets of the partition point, and set the partition value as any real number between the maximum value of the left bucket and the minimum value of the right bucket.

(2) According to the training result of bank A, the data of user 11 is brought into all decision trees respectively, and according to the tree structure, according to the partition positions of feature B and feature C returned by bank A to bank B and bank C, the size relationship between the data of user 11 and the partition value corresponding to the partition position is compared. User 11 is put on the left or right node, the above process is repeated to find out the leaf node to which user 11 is finally assigned. The running results of user 11 on all trees are added up to get the final prediction result.

Figure 2:
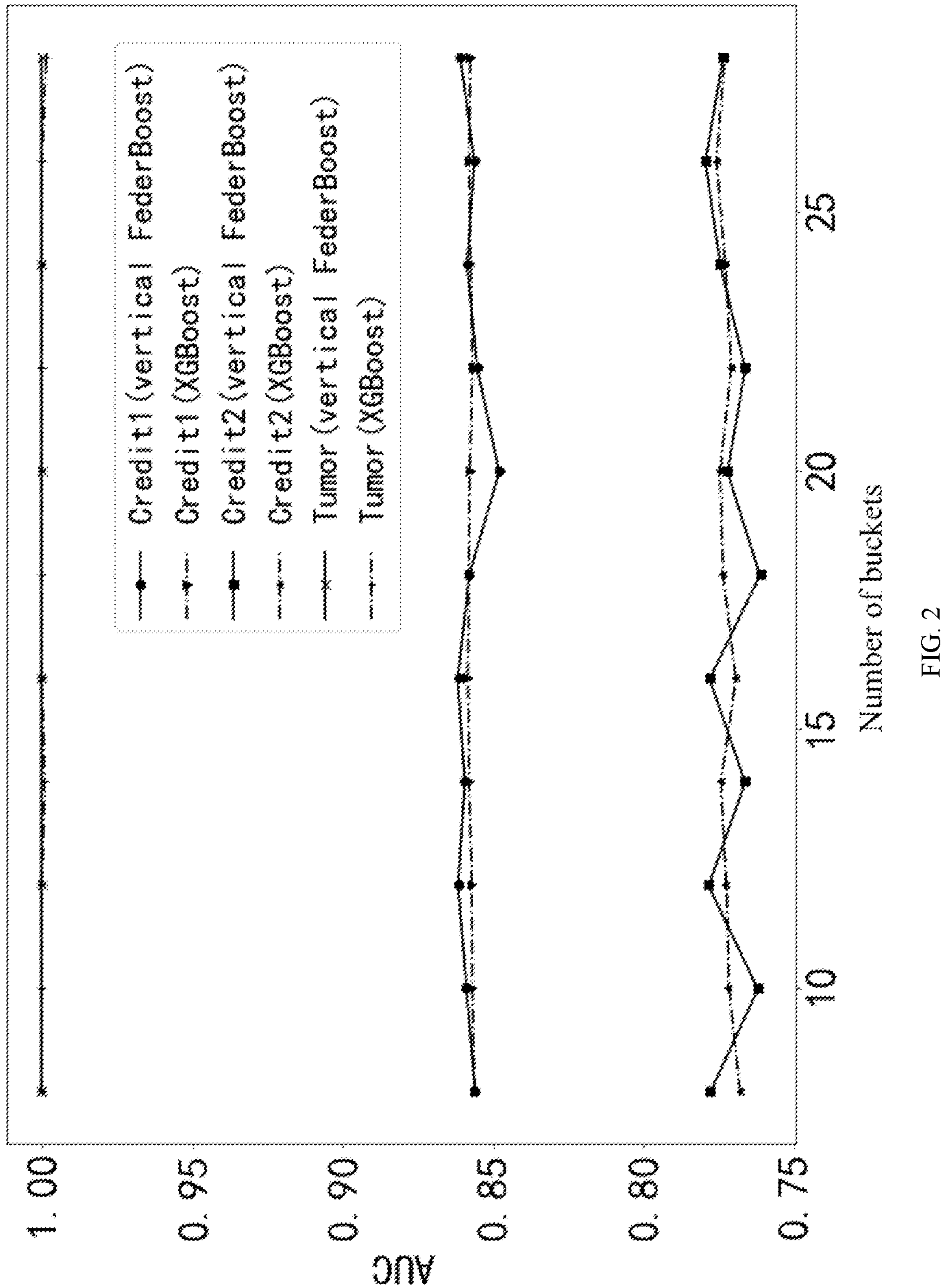
FIG. 2 is a comparison between the accuracy of the final measurement by this method when taking different bucket numbers and the running results of the XGBoost method on three different public data sets.

FIG. 2 is a comparison between the decision tree-oriented vertical FederBoost method and the XGBoost method as a baseline method under AUC measurement standard when the number of buckets is different. Among them, Credit1 is a credit evaluation data set, which is used to predict the probability that users will encounter economic crisis, so as to judge whether loans should be given. It contains 150,000 samples and 10 features. Credit2 is another credit evaluation data set, which is used to predict whether users will pay on time. It contains 30000 instances and 23 features. BC-TCGA-Tumor is a gene expression data set for cancer diagnosis, which contains 61 normal samples and 529 breast cancer samples. Each sample has 17814 features. The results show that the accuracy of this federated learning method has reached the same level as the decision tree algorithm of non-federated learning, and it has practical value.

Figure 3:
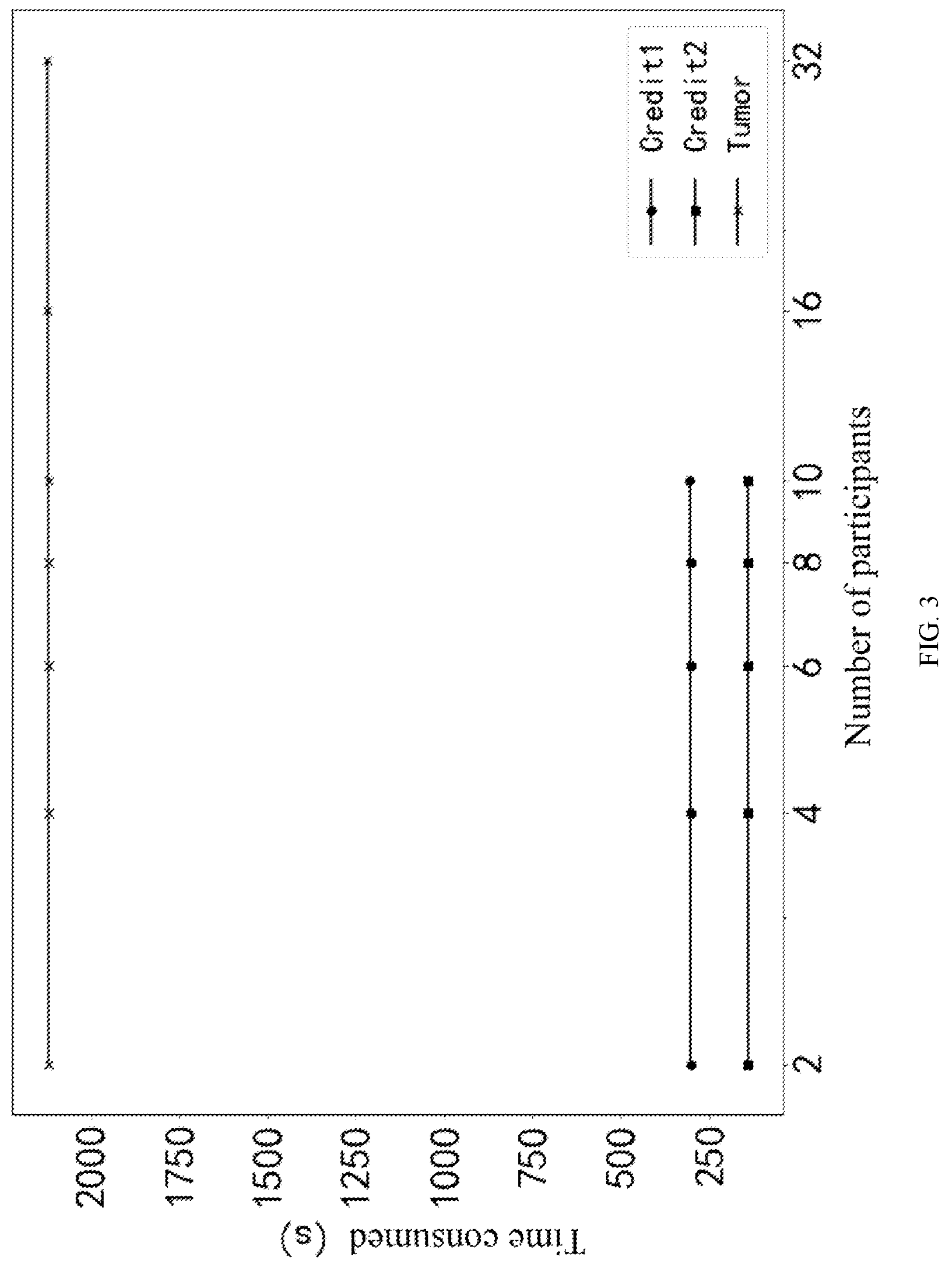
FIG. 3 is an image of the relationship between the training time and the number of participants under the assumption that the network delay is 100 ms.

FIG. 3 is a picture of the relationship between the training time and the number of participants when the network delay is assumed to be 100 ms, which shows that this method consumes less time. Compared with other federated learning methods considering privacy, it needs to transmit data between different participants in each iteration of training. This method consumes less time, has no relation with the number of participants, and has greatly improved performance.

Obviously, the above-mentioned embodiments are only examples for clear explanation, and are not a limitation of the implementation. For those of ordinary skill in the field, other changes in different forms can be made on the basis of the above description. All embodiments need not be exhaustive here. However, the obvious changes or variations derived therefrom are still within the scope of protection of the present application.

What is claimed is:

1. A decision tree-oriented vertical federated learning method, wherein the method is executed between distributed participant nodes and a coordinator node through the XGBoost framework, and is implemented by processors of the participant nodes and the coordinator node, comprising following steps:

(1) each participant node sorting features of locally stored samples in ascending or descending order according to numerical values of the corresponding features, wherein a total number of iterations required for sorting is the same as the number of features; and evenly dividing the sorted samples corresponding to each feature into J data blocks, wherein each data block is called a bucket and assigned a unique bucket number $i \in \{0, 1, \ldots, J-1\}$, and each bucket contains a same number of samples;

(2) for a group of samples corresponding to each feature, replacing a bucket number of each sample under the feature with other bucket numbers $\{0, 1, \ldots j, \ldots, J-1\}$ with a certain selected probability, generating a random number $r \in [0, 1]$, wherein when r satisfies:

$$\frac{j}{e^{\varepsilon}+J-1} \leq r < \frac{j+1}{e^{\varepsilon}+J-1},$$

the bucket number is replaced with a j-th bucket number, otherwise an original bucket number is retained, where $\varepsilon \geq 1.5$; and encrypting the bucket number to satisfy ε-local differential privacy (ε-LDP);

(3) each participant node transmitting the bucket numbers corresponding to the samples obtained in step (2) to the coordinator node according to an order of the samples, after receiving the bucket numbers transmitted by the participant nodes, the coordinator node aligning and combining bucket numbers of different features for a same sample according to a unique identification of the sample, establishing a data table, and storing the data table in a DataFrame data format;

(4) the coordinator node calculating first-order gradients and second-order gradients of each sample according to label information available at the coordinator node, and summarizing the first-order gradients and the second-order gradients of each bucket corresponding to each feature; for a group of samples corresponding to each feature, dividing data by bucket and calculating information gain, and finally, recording a current feature number and a bucket number at a partition position corresponding to a maximum information gain, and returning the current feature number and the bucket number at the partition position to the corresponding participant node;

(5) the corresponding participant node, according to the returned bucket number, dividing the samples into left nodes and right nodes by assigning samples in buckets with bucket numbers not greater than the returned bucket number at the partition position to the left nodes and assigning samples in buckets with bucket numbers greater than the returned bucket number at the partition position to the right nodes, and recursively executing step (4) until reaching a preset tree depth; and (6) calculating a residual based on an output of a previous round of decision trees using the XGBoost algorithm framework, and updating the first-order gradients and the second-order gradients and repeating step (4) to step (5) until a number of decision trees reaches a preset upper limit, wherein during model training, the participant nodes send adjusted bucket numbers of local samples under different features to the coordinator node, and the coordinator node trains a whole decision tree model in combination with local labels by taking each bucket as a unit to participate in traversal and finding a partition corresponding to a maximum gain, thereby avoiding extensive encryption and parameter communication processes and improving training efficiency under distributed network communication conditions.

2. The decision tree-oriented vertical federated learning method according to claim 1, wherein the step (4) comprises the following sub-steps:

(4.1) the coordinator calculating a gradient of each sample according to the established data table, and summarizing the gradients of samples in a same bucket for each feature through the received and local bucket numbers; and (4.2) the coordinator traversing all possible partitions, wherein the coordinator takes each bucket as a unit to participate in the traversal, finds a partition corresponding to a maximum gain, records a current feature and a bucket number at the partition, and returns the current feature and the bucket number to the participant with the corresponding feature data.

3. The decision tree-oriented vertical federated learning method according to claim 2, wherein the step (5) comprises the following sub-steps:

(5.1) according to the partition corresponding to the maximum gain obtained in step (4), the coordinator dividing the sample data corresponding to each feature into two parts, which are recorded as a left node and a right node, respectively, wherein the left and right nodes respectively hold different samples and data corresponding to the samples, and for any node, the data in the node is processed as follows: for each feature, summarizing the gradients of the samples in the same bucket; and (5.2) after performing step (5.1) at the left and right nodes, respectively, the coordinator traversing all possible partitions at the left and right nodes, respectively, finding the partition corresponding to the maximum gain, recording the current feature and the bucket number at the partition, and returning the current feature and the bucket number to the participant with the corresponding feature data; repeating the traversal until a depth of the decision tree reaches a set maximum.

4. The decision tree-oriented vertical federated learning method according to claim 3, wherein the step (6) comprises the following sub-steps:

(6.1) the coordinator calculating a residual error according to a result of a previous tree and updating the gradients of all samples; and (6.2) the coordinator repeating steps (4) and (5) to build a new tree according to the updated gradients until the number of decision trees reaches a set maximum number.

* * * * *